United States Patent [19]
Johnson

[11] Patent Number: 4,462,565
[45] Date of Patent: Jul. 31, 1984

[54] ERECTABLE AND RETRACTABLE SUPPORT FOR ROLLING CONDUCTOR TRACK

[75] Inventor: George W. Johnson, Smyrna, Ga.

[73] Assignee: Lockheed Corporation, Burbank, Calif.

[21] Appl. No.: 458,357

[22] Filed: Jan. 17, 1983

[51] Int. Cl.³ ............................................. F16L 3/00
[52] U.S. Cl. ..................................... 248/51; 59/78.1; 191/12 C; 248/49; 248/68.1
[58] Field of Search .................. 248/51, 49, 68 R, 52, 248/55; 137/355.17, 355.16, 355.22; 191/12 C, 12 R; 59/78.1; 74/37, 89.2

[56] References Cited

U.S. PATENT DOCUMENTS

| | | | |
|---|---|---|---|
| 3,157,376 | 11/1964 | Merker et al. | 248/49 |
| 3,161,205 | 12/1964 | Merker | 137/355.17 |
| 3,284,036 | 11/1966 | Nansel | 248/49 |
| 3,446,159 | 5/1969 | Lawson | 191/12 R |
| 3,504,864 | 4/1970 | Kurlandsky | 248/51 |
| 3,590,854 | 7/1971 | Cork | 137/355.16 |
| 3,782,670 | 1/1974 | Kielma | 59/78.1 |
| 4,129,277 | 12/1978 | Tenniswood | 248/51 |
| 4,311,293 | 1/1982 | Tenniswood | 248/49 |
| 4,373,324 | 2/1983 | Janos | 59/78.1 |
| 4,392,344 | 7/1983 | Gordon et al. | 248/49 |

Primary Examiner—William H. Schultz
Assistant Examiner—Ramon O. Ramirez
Attorney, Agent, or Firm—John J. Sullivan

[57] ABSTRACT

This invention relates to a flexible, rolling track assembly (12) that carries and keeps aligned various flexible conductors, as exemplied by electrical, coolant and hydraulic lines, extending between locations (13,14) associated with a machine (15) that is movable along guides or rails whereby the relative spacing between the locations (13,14) is constantly changing by increasing or decreasing as the machine (15) travels along the guides or rails; and more particularly, the invention concerns a structure arrangement (10,11) that functions as a self-erecting support for the track assembly (12) as the portion of the track assembly (12) to which the structure (10,11) is connected rolls upwardly to an elevated position, while vice-versa, the structure arrangement (10,11) functions as a self-retracting track assembly support as the portion of the track assembly (12) to which the structure is connected rolls downwardly to a retracted position.

5 Claims, 6 Drawing Figures

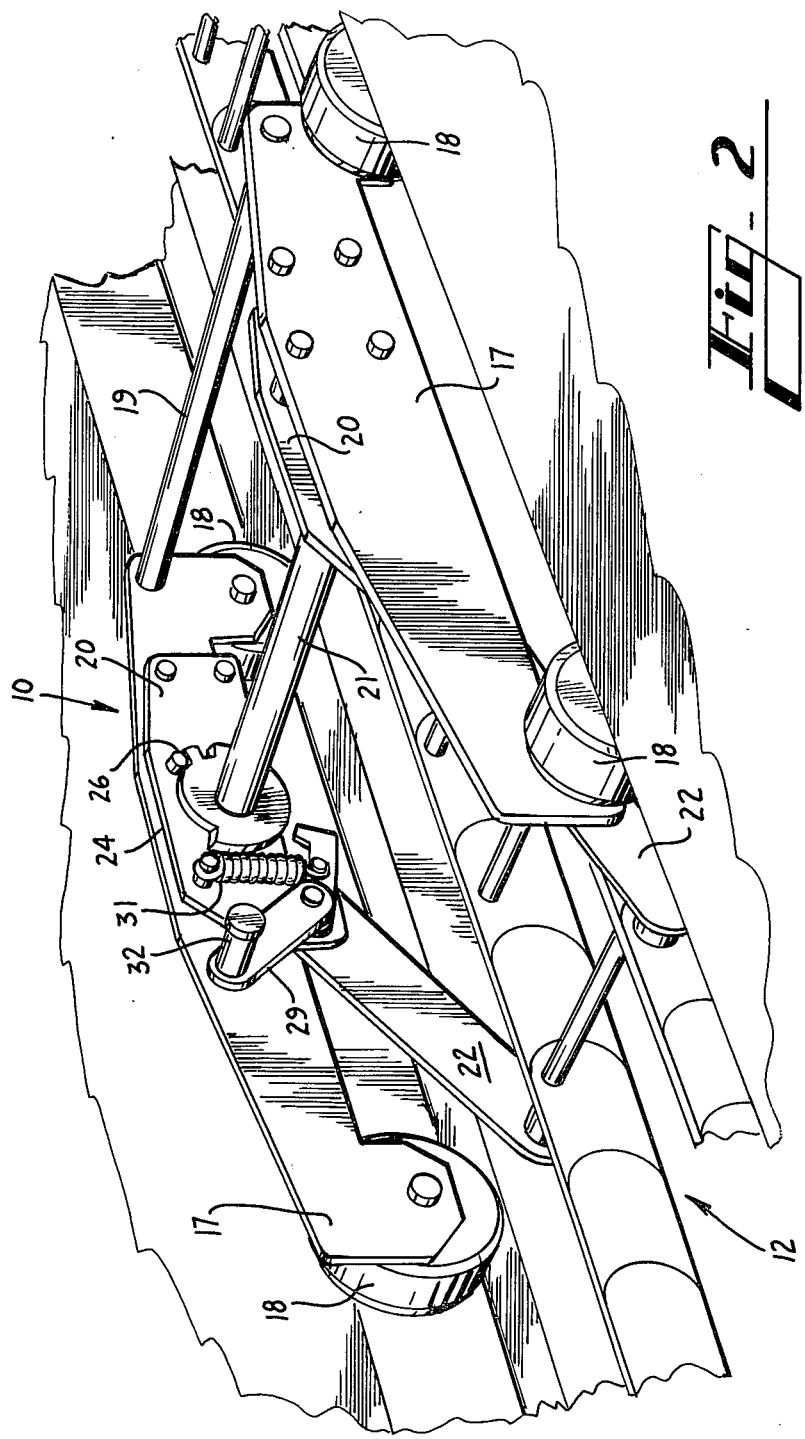

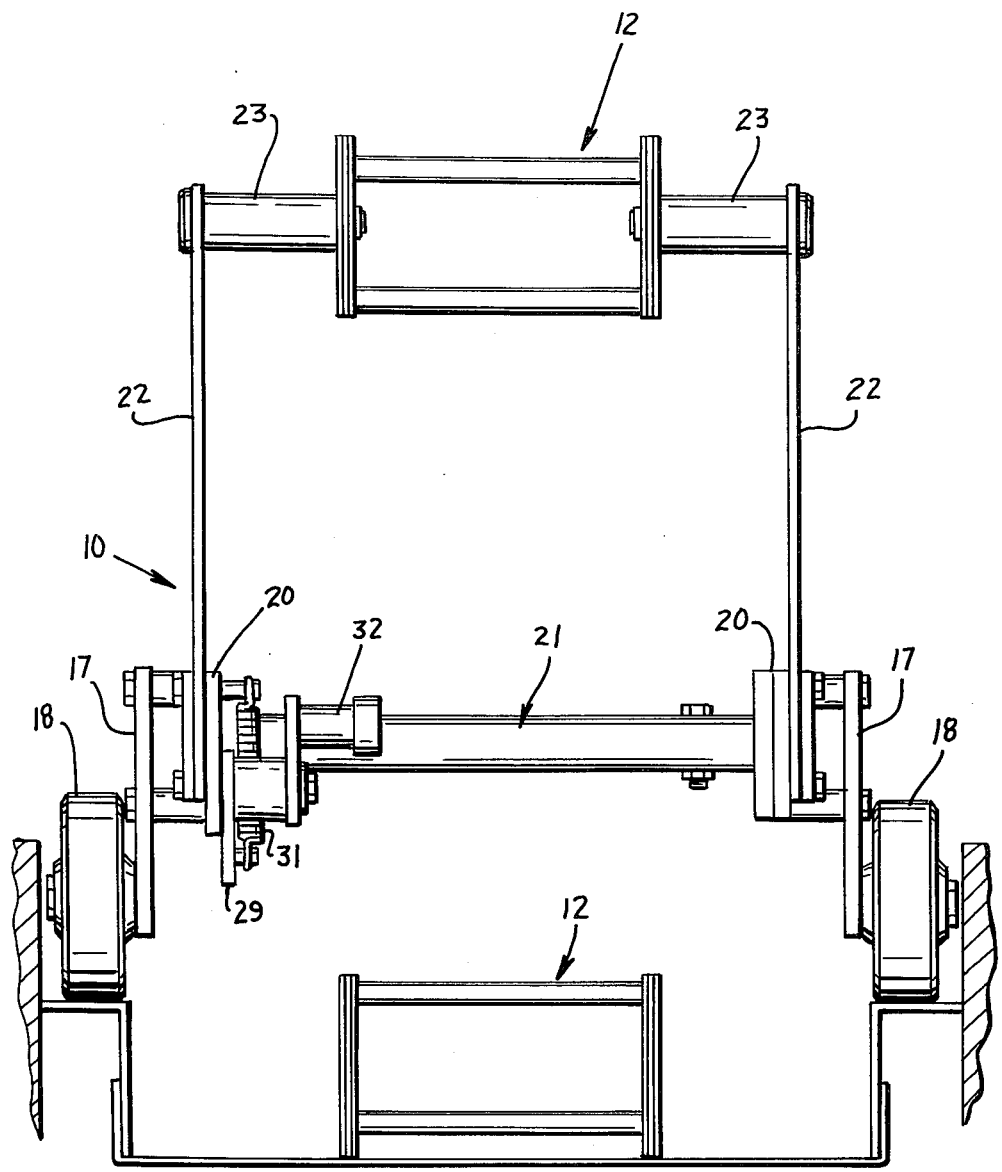
Fig_3

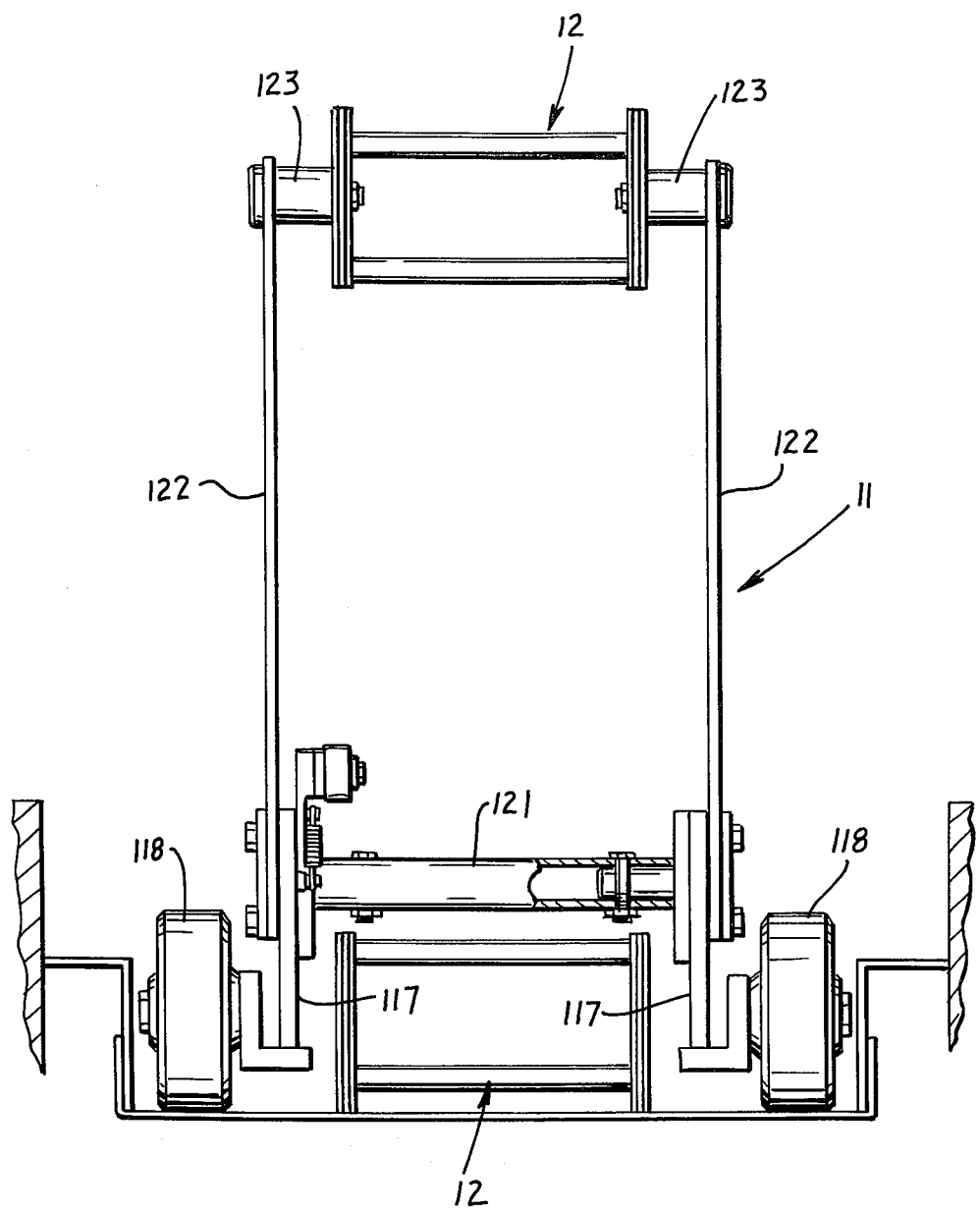

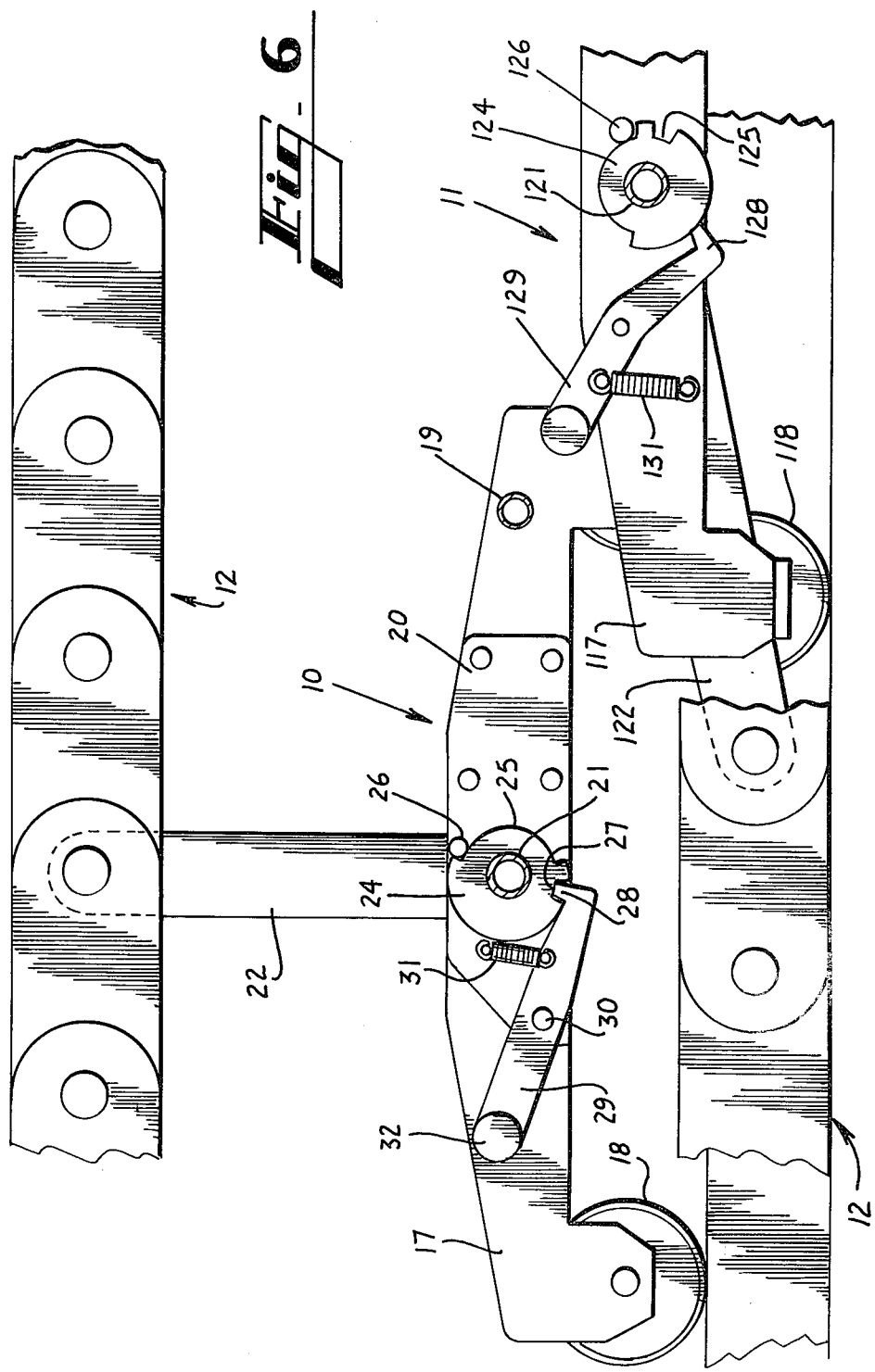

ERECTABLE AND RETRACTABLE SUPPORT FOR ROLLING CONDUCTOR TRACK

TECHNICAL FIELD

This invention concerns an erectable and retractable support device to be used in conjunction with what is known in the prior art as rolling conductor track systems whose purpose is to retain in an orderly arrangement a quantity (either singular or plural) of conductor lines between a fixed location and a moving location that traverses rectilinearly relative to the fixed location.

BACKGROUND ART

The track systems with which this invention is involved consists generically of a pair of laterally spaced chain assemblies comprised of linkages that permit a 180° change in direction of travel in at least one direction as the rectilinearly traversing movable station of the conductors carried by the track system moves relative to the fixed station of the conductors as typified by U.S. Pat. Nos. 2,864,907 and 3,590,854. Because of the flexibility of the side chain assemblies, there is a distance of travel limitation in conductor carrying track systems of this type determined by the amount of sag inherent in the elevated track portion unless some type of intermediate support for the elevated track portion is provided.

To overcome such inherent distance of travel limitations, support arrangements for elevated track portions have been shown in the prior art as exemplified by U.S. Pat. Nos. 3,161,205 and the above cited 3,590,854. However, such supports as typified by such prior art devices still contain limitations that can prevent their utilization in as broad an application spectrum as the instant invention. For example, utilization of the arrangement shown in U.S. Pat. No. 3,161,205 dictates that the machine connecting to the movable end of the conductors must provide sufficient clearance to pass over the permanent structure that supports the elevated portion of the track system, while the inverted support device shown in FIGS. 17 and 18 of U.S. Pat. No. 3,590,854 dictates that no more than one such support can be used in a single track installation whereby the maximum extent of travel for the movable station is limited.

DISCLOSURE OF THE INVENTION

This invention provides a support device for a movable elevated track of the type described wherein the support is self-erectable through an interconnection with the track system when the length of the elevated track portion becomes sufficient to necessitate support, while the support is also self-retractable when the elevated track length reduces sufficiently to obviate the need for such track support.

By appropriate track layout or arrangement, a plurality of support devices of this invention can be utilized whereby the heretofore limitations on elevated track length and movable machine clearances are substantially, if not completely eliminated.

BRIEF DESCRIPTION OF THE DRAWINGS

FIG. 2 is a perspective view of one embodiment of the support device of this invention in the retracted position;

FIG. 3 shows the support device embodiment of FIG. 2 in its erected position when viewed normal to the plane of erected track alignment;

FIG. 4 is a perspective view of a second embodiment the support device of this invention in the retracted position;

FIG. 5 shows the support device embodiment of FIG. 4 in its erected position when viewed normal to the plane of erected track alignment; and FIG. 6 is a partial cross-sectioned side view showing the relationship between the first embodiment of support device in its erected position and the second embodiment of support device in its retracted position as the first support device passes over the second support device.

DETAIL DESCRIPTION

Figure 1:
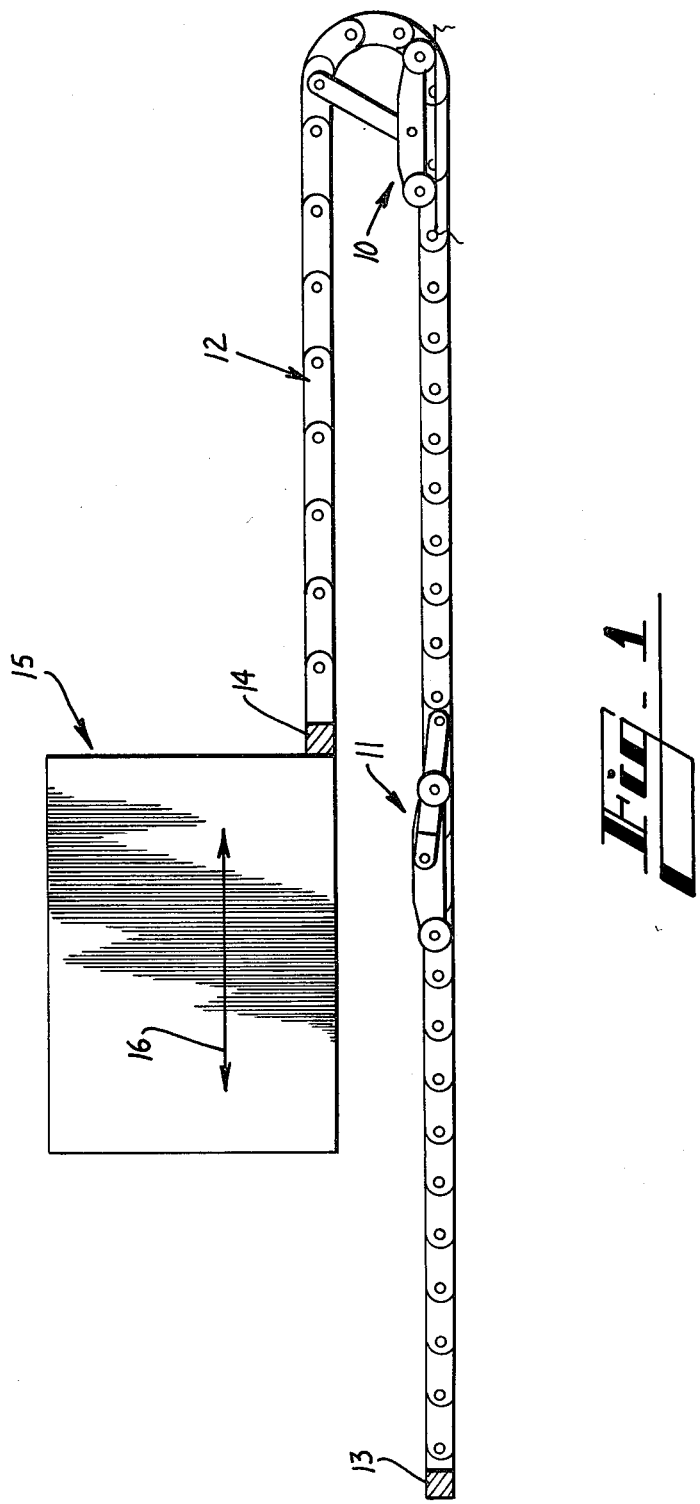
FIG. 1 is a side view of a rolling track assembly incorporating two embodiments of the self-erecting and retracting support device of this invention.

In FIG. 1 there is shown track support devices 10 and 11 depicted in their working environment of a flexible track assembly 12 serving to maintain alignment of one or more flexibly aligned conductors between a fixed station or connection 13 and a movable station or connection 14 that constitutes part of a machine 15 that is traversible rectilinearly relative to fixed station 13 as represented by directional arrow 16. The relative positions or locations of the elements shown in FIG. 1 are such that there has been sufficient movement of movable station 14 relative to the fixed station 13 that support device 10 is in a partially erected condition and support device 11 is in a fully retracted position as will be explained in more detail below.

It is to be understood that specific details of the links or interconnections thereof of track 12 are not shown as they do not form any part of this invention other than exemplification of installation, operational and functional purposes of this invention. The same can also be said for the three conductors C shown only in FIG. 4 for clarification purposes, and which are carried by the conventional track assemblies 12 known in the prior art.

Referring to FIGS. 2, 3 and 6, support device 10 encompasses a pair of laterally spaced side members 17, each having a wheel 18 depending from opposite ends thereof, with the side members 17 interconnected by an appropriate spacer bar 19. Lateral spacing of side members 17 is such that support device 10 will straddle the conductor carrying track or chain assembly 12 when the portion of said track assembly 12 proximate its point of connection to support 10 is in its unelevated position.

Mounted on each interior of confronting face of side members 17 and spaced therefrom is a bearing plate 20 with an appropriate torque tube assembly 21 that extends horizontally both between and through the bearing plates 20 to the space between each plate 20 and the side member 17 it is connected to.

One end of a crank arm or member 22 is fixedly connected to each of the opposite ends of torque tube 21 in the spacing between the side member 17 and plate 20 with the opposite ends of the crank members 22 each pivotally connected to a respective side of the flexible track assembly 12 by an appropriate rod or spacer 23 as best seen in FIG. 3. The axes of pivotal connection between the crank members 22 and track assembly 12 are preferably coaxial.

Means for retaining the crank or support arms 22 in an upright and locked position is accomplished by providing a double peripherally-slotted cam plate 24 securely mounted on torque tube 21 so as to rotate therewith. Plate 24 contains an elongated accurate slot 25 in which is located a fixed pin 26 extending from the side of bearing plate 20. A second peripheral slot 27 is provided on plate 24 into which a pawl or dog 28 of lever 29 pivotally connected to bearing plate 20 at connection 30; dog 28 being urged into slot 27 by tension spring 31 connected between bearing plate 20 and lever 29. The other end of lever 28 has a laterally extending trip or release finger 32 whose purpose and function will be explained hereinafter.

FIGS. 4, 5 and 6 show details of the support device 11 as depicted in FIG. 1; support device 11 consisting of the same general details as support device 10 with some structural differences now explained. Support device 11 comprises a pair of laterally spaced side members 117, each appropriately wheeled with wheels 118. Lateral spacing of side members 117 is maintained by spacer bar 119 (FIG. 4) and carries a torque tube assembly 121. Torque tube 121 extends through both side members 117 where one end of the crank arms 122 are securely fastened to torque tube 121 on the outer (non-confronting) sides of the side members 117. The other ends of crank arms 122 are in turn pivotally connected to track assembly 12 by shafts or spacers 123. A slotted cam plate 124 having substantially the same geometry and function of plate 24 is securely mounted on torque tube 121 for cooperation with pin 126 extending from the appropriate side member 117 and the pawl or dog 128 on one end of lever 129. Lever 129 is in turn pivotally connected to side member 117 and has a trip or release finger 132 at the other end thereof; the locking pawl 128 in turn being biased into engagement with the locking slot 125 of plate 124 by a tension spring 131.

OPERATION OF THE INVENTION

Referring to FIGS. 1, 2, 3 and 6, erection of support device 10 (which is shown partially erected in FIG. 1) occurs as machine 15 moves to the left as shown in FIG. 1. When the opposing pair of links in the conductor support track 12 to which crank arms 22 are connected begin their upward travel to constitute a segment of the elevated portion of track assembly 12, the rotation of crank arms 22 relative to the side members 17 causes torque tube 21 and plate 24 to rotate in a clockwise direction as viewed in FIGS. 2 and 6. Such clockwise rotation continues until pawl 28 of lever 29 engages the small or short slot 27 of wheel 24; this engagement taking place through the force of spring 31 biasing lever 29 in a counter-clockwise direction about pivot connection 30 at which time the arms 22 are locked in their upright positions as seen in FIGS. 2 and 3.

Continued movement of machine 15 to the left after support device 10 is erected and locked results in erected support device 10 rolling on wheels 18 to the left as viewed in FIG. 1 as additional segments of track 12 move from their lower or nested position to an elevated status.

Once erected, the retraction of support device 10 occurs upon the reverse movement of machine 15, i.e., in this case to the right as seen in FIG. 1 with the elevated segments of track 12 turning downwardly to a nested or non-elevated position in sequential order. Support device 10 continues to roll to the right in its erected state until the trip to release finger 32 on lever 29 contacts the loop portion of track 12 causing lever 29 to rotate clockwise about pivot 30 thereby disengaging pawl 28 from slot 27 of plate 24. This unlocking action permits arms 22 to rotate downwardly in a clockwise direction as seen in FIG. 1 and a counter-clockwise direction as viewed in FIG. 6.

It is to be recognized that with the operation of support 10 as described, said support 10 is substantially stationary when in its retracted state and when in its erected state is rollable concurrently with movement of machine 15. Thusly, should the extent of travel of machine 15 be such that it passes over the position of support 10 when support 10 is retracted, concern about vertical clearance between machine 15 and retracted support 10 can be minimized as well as the overall length of track 12 can be held to an effective minimum.

In those instances where the length of travel of machine 15 is sufficient to necessitate more than one elevated track support, a second support device 11 is provided with some differences therebetween for clearance purposes. The preferred arrangement for handling a double support installation is to provide a separate pair of wheel pathways for each of the two supports with some vertical displacement between the pairs of pathways. In other words, the tread of wheels 18 on support 10 is wider than the tread of wheels 118 on support 11 with the surfaces on which wheels 18 of support 10 roll being spatially located above the surfaces on which wheels 118 of support 11 roll. With this arrangement, support 10, which will erect first, can roll over the stationary and retracted support 11 which will not begin to be erected until support 10 is located well to the left of it as viewed in FIG. 1. Also to be recognized is the differences in wheel treads and rolling surfaces height will in turn result in longer length crank arms 122 and a shorter axial length for trip finger 132 on support 11 as compared to the corresponding elements on support 10.

It is to be understood that the foregoing disclosure is illustrative of a preferred embodiment of the invention. Various changes and modifications to this embodiment will suggest themselves to those skilled in the art without departing from the true spirit and scope of the invention as set forth in the appended claims which alone define the true limitations of the invention.

I claim:

1. An erectable and retractable support device that is connectable to a segmented rollable conductor track assembly that carries conductors between a fixed station and a movable station mounted to a machine movable relative in the fixed station wherein the conductors remain connected between the fixed and movable stations regardless of the location of the machine relative to the fixed station, said support device comprising:
    a pair of side member assemblies, laterally spaced in fixed relation to each other, with each side member assembly having a pair of wheels departing therefrom to form a rollable carriage assembly of a fixed tread;
    a torque-tube member rotationally mounted to each of the side member assemblies proximate each end of the torque-tube member;
    a pair of elongated crank arm members each having one end fixedly secured to the torque-tube member proximate an end thereof, both of the crank arm members extending from said torque-tube member in a common direction and the other end of each crank arm member pivotably connected to a segment of the conductor track assembly;
    a cam plate member fixedly secured to said torque-tube member for rotation therewith and having a first and a second circumferential slot thereon;

a first means secured to one of said side member assemblies and locatable in the first circumferential slot of said plate member whereby said torque-tube and said crank arm members may rotate between a retracted position and an erected position that is substantially perpendicular to a path of travel of the carriage assembly, the rotation of the torque-tube and plate members occurring by the movement of the ends of the crank arms pivotally connected to track assembly segment moving from a flat position to an elevated position for erection of the support device as well as corresponding movements in the reverse direction for retraction of the support device;

and a second means pivotally secured to said one of said side member assemblies, said second means including a lock member biased into locked engagement with the second circumferential slot on said plate member when the crank arms are in their upright position whereby said support device is locked in an erected position, said second means further including a means for tripping the lock member out of engagement with the second circumferential slot as the tripping means is mechanically activated by engagement with a portion of the track assembly that is intermediate of and moving from an elevated position to a flat position.

2. An erectable and retractable support device as claimed in claim 1 wherein the mounting of the torque-tube member to the side member assemblies is such that the crank arm members rotate between said side member assemblies.

3. An erectable and retractable support device as claimed in claim 1 wherein the torque-tube member extends through both side member assemblies and the fixed connection of each crank arm member to the torque-tube member is adjacent the non-confronting side of its respective side member assembly relative to the other side member assembly.

4. An erectable and retractable support device as claimed in claim 1 wherein the arcuate extent of the first circumferential slot is such to permit rotation of the crank arm members through at least 90 degrees of arc between said retracted and erected positions.

5. An erectable and retractable support device as claimed in claim 1 wherein said cam plate member is secured to said torque-tube member intermediate the connections of the crank arm members to the torque-tube member.

* * * * *